United States Patent
Kozuka et al.

(10) Patent No.: US 9,502,947 B2
(45) Date of Patent: Nov. 22, 2016

(54) GENERATOR FOR VEHICLE

(71) Applicant: Mitsubishi Electric Corporation, Chiyoda-ku, Tokyo (JP)

(72) Inventors: Kentaro Kozuka, Chiyoda-ku (JP); Kenji Tsuruhara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 337 days.

(21) Appl. No.: 14/339,589

(22) Filed: Jul. 24, 2014

(65) Prior Publication Data
US 2015/0236571 A1 Aug. 20, 2015

(30) Foreign Application Priority Data
Feb. 17, 2014 (JP) .................. 2014-027552

(51) Int. Cl.
*H02K 5/00* (2006.01)
*H02K 11/04* (2016.01)
*H02K 9/22* (2006.01)
*H02K 5/18* (2006.01)
*H02K 9/06* (2006.01)

(52) U.S. Cl.
CPC ............... *H02K 11/046* (2013.01); *H02K 5/18* (2013.01); *H02K 9/22* (2013.01); *H02K 9/06* (2013.01)

(58) Field of Classification Search
CPC ..... H02K 11/046; H02K 11/048; H02K 5/04
USPC .................. 310/68 D, 89, 401, 413, 415, 417
See application file for complete search history.

(56) References Cited

U.S. PATENT DOCUMENTS

| | | | | |
|---|---|---|---|---|
| 8,350,426 B2* | 1/2013 | Tanaka | ............... | H02K 5/225 310/43 |
| 2002/0043885 A1* | 4/2002 | Asao | ............... | F16C 19/08 310/90 |
| 2011/0187243 A1* | 8/2011 | Oohashi | ............... | H02K 5/141 310/68 D |
| 2014/0167542 A1* | 6/2014 | Ohashi | ............... | H02K 5/225 310/89 |

FOREIGN PATENT DOCUMENTS

| | | |
|---|---|---|
| JP | 07-170695 A | 7/1995 |
| JP | 3430016 B2 | 7/2003 |
| JP | 3913903 B2 | 5/2007 |

* cited by examiner

*Primary Examiner* — Thanh Lam
(74) *Attorney, Agent, or Firm* — Sughrue Mion, PLLC; Richard C. Turner

(57) ABSTRACT

Provided is an AC generator for a vehicle, which is improved in heat-radiation performance and vibration resistance with a simple configuration. The AC generator for a vehicle includes a rectifier which is mounted to a rear bracket (2) and is electrically connected to a stator, for rectifying an alternating current generated in the stator into a direct current. The rear bracket (2) includes a bracket main body (30) having intake windows (32) and exhaust windows (34) partitioned by ribs (33), and a bearing housing portion (41) for housing a bearing therein, a mounting leg portion (31) extending radially outward from the bracket main body (30) so as to be mounted to a mounting target member, and an expanded portion (37) expanding radially from the mounting leg portion (31) toward a circumferential edge portion of the bracket main body (30).

8 Claims, 11 Drawing Sheets

GENERATOR FOR VEHICLE

BACKGROUND OF THE INVENTION

1. Field of the Invention

The present invention relates to an AC generator for a vehicle, which includes a bracket having fixed thereto a rectifier for rectifying an alternating current generated in a stator into a direct current.

2. Description of the Related Art

With an increasing number of electric components to be mounted in a vehicle, an AC generator for a vehicle, which is to be mounted in a vehicle, has a larger vehicle load, and therefore is required to have a higher output. In addition, the AC generator for a vehicle is required to be downsized so as to improve fuel efficiency.

The AC generator for a vehicle is used in a high-temperature and high-vibrational environment. Thus, the AC generator for a vehicle is desired to have heat resistance and vibration resistance.

The following AC generator for a vehicle with improved heat resistance is conventionally known. Specifically, the AC generator for a vehicle includes a generator main body, a heat-radiating section provided adjacent thereto in an axial direction, and heat pipes which are extended from a bracket in the axial direction to connect the generator main body and the heat-radiating section.

However, the above-mentioned AC generator for a vehicle has the following problems. In the AC generator for a vehicle, the heat-radiating section is provided outside of the generator main body. Hence, a structure becomes complex. In addition, due to the increase in number of components, manufacturing steps become also complex to increase costs. Further, the AC generator for a vehicle has poor vibration resistance.

SUMMARY OF THE INVENTION

The present invention has been made to solve the problems described above, and therefore has an object to provide an AC generator for a vehicle at low cost, which is capable of improving heat-radiation performance and vibration resistance with a simple configuration.

According to one embodiment of the present invention, there is provided an AC generator for a vehicle, including: a casing including a front bracket and a rear bracket; a shaft rotatably supported by the casing through an intermediation of a bearing; a rotor firmly fixed to the shaft; a stator firmly fixed to an inner wall surface of the casing so as to surround the rotor; and a rectifier mounted to the rear bracket and electrically connected to the stator, for rectifying an alternating current generated in the stator into a direct current.

The rear bracket includes: a bracket main body including ventilation windows partitioned by ribs, and a bearing housing portion for housing the bearing therein; a mounting leg portion extending radially outward from the bracket main body so as to be mounted to a mounting target member; and an expanded portion expanding radially from the mounting leg portion toward a circumferential edge portion of the bracket main body.

According to the AC generator for a vehicle of one embodiment of the present invention, the rear bracket includes the expanded portion which expands radially from the mounting leg portion toward the circumferential edge portion of the bracket main body. Therefore, the heat-transfer sectional area of the AC generator for a vehicle for heat from the rectifier to the mounting target member and the heat-radiating area of the rear bracket increase. As a result, the heat-radiation performance is improved.

Moreover, by providing the expanded portion, a volume of a base portion of the AC generator for a vehicle, which is to be supported by the mounting target member, increases to improve the vibration resistance.

DETAILED DESCRIPTION OF THE PREFERRED EMBODIMENTS

Figure 1:
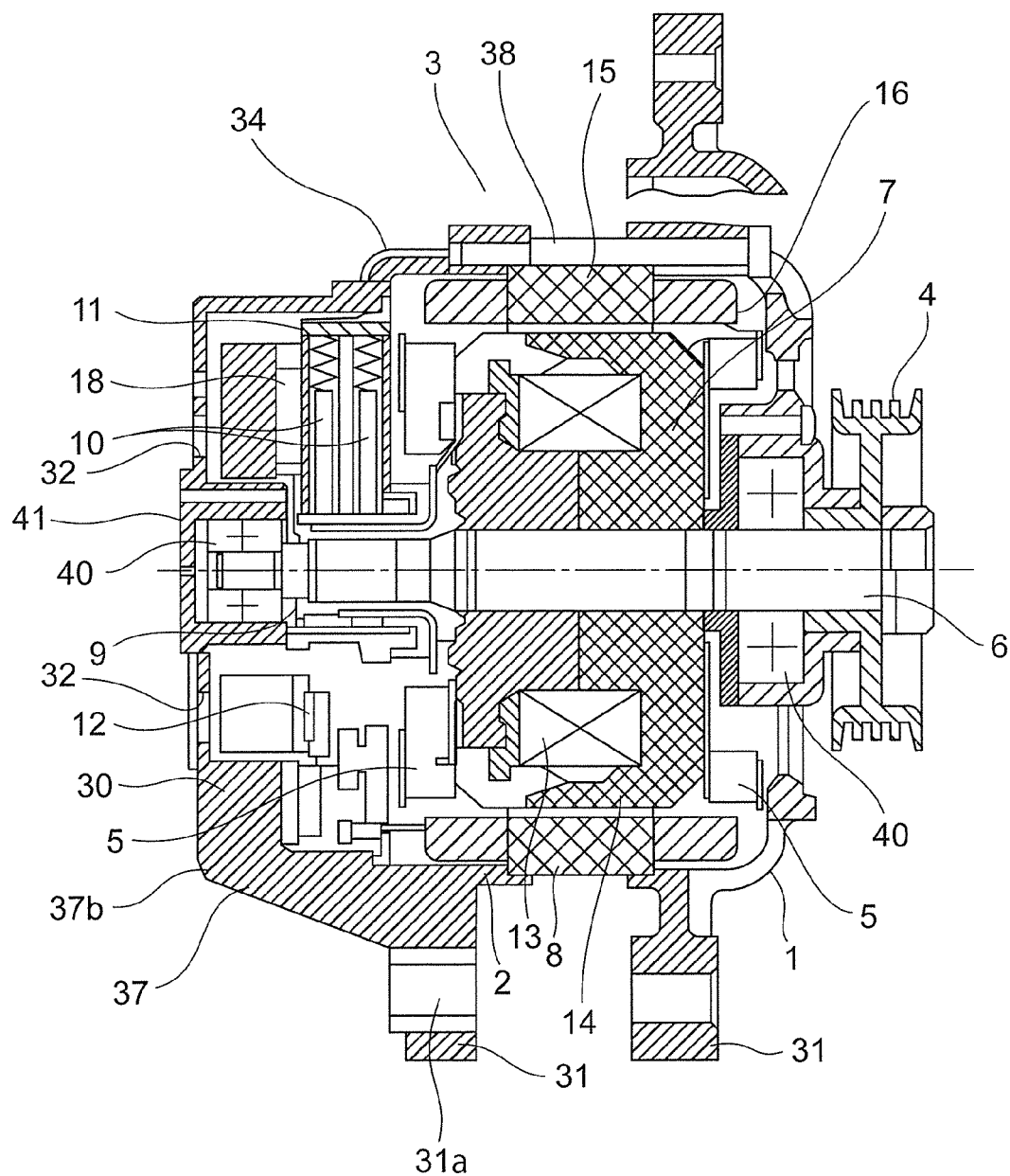
FIG. 1 is a sectional side view illustrating an AC generator for a vehicle according to a first embodiment of the present invention.

Now, an AC generator for a vehicle according to each of embodiments of the present invention is described referring to the drawings. In the drawings, the same or corresponding members and parts are denoted by the same reference symbols for description.

First Embodiment

FIG. 1 is a sectional side view illustrating an AC generator for a vehicle according to a first embodiment of the present invention.

The AC generator for a vehicle includes a casing 3, a shaft 6, a rotor 7, fans 5, a stator 8, a slip ring 9, a pair of brushes 10, a rectifier 12, and a regulator 18. The casing 3 includes a front bracket 1 and a rear bracket 2 each made of aluminum. The shaft 6 is rotatably supported by the casing 3 through an intermediation of bearings 40. A pulley 4 is firmly fixed to an end portion of the shaft 6 on the front bracket 1 side. The rotor 7 is a Lundell-type rotor which is firmly fixed to the shaft 6. The fans 5 are respectively firmly fixed to both side surfaces of the rotor 7. The stator 8 is firmly fixed to an inner wall surface of the casing 3 so as to surround the rotor 7. The slip ring 9 is firmly fixed to an end portion of the shaft 6 on the rear bracket 2 side so as to supply a current to the stator 8. The pair of brushes 10 is housed inside a brush holder 11 which is firmly fixed to the rear bracket 2, and slides against the slip ring 9. The rectifier 12 is mounted to the rear bracket 2 and is electrically connected to the stator 8 to rectify an alternating current generated in the stator 8 into a direct current. The regulator 18 is fitted into the brush holder 11, and regulates a magnitude of an AC voltage generated in the stator 8.

The rotor 7 includes a rotor coil 13 and a pole core 14. The rotor coil 13 allows a current to flow therethrough to generate a magnetic flux. The pole core 14 is provided so as to cover the rotor coil 13. In the pole core 14, magnetic poles are formed by the magnetic flux generated by the rotor coil 13.

The stator 8 includes a stator core 15 and a stator coil 16. The stator coil 16 is formed by winding a conductor wire around the stator core 15. The stator coil 16 generates the alternating current due to a change in the magnetic flux from the rotor coil 13 along with the rotation of the rotor 7.

Figure 2:
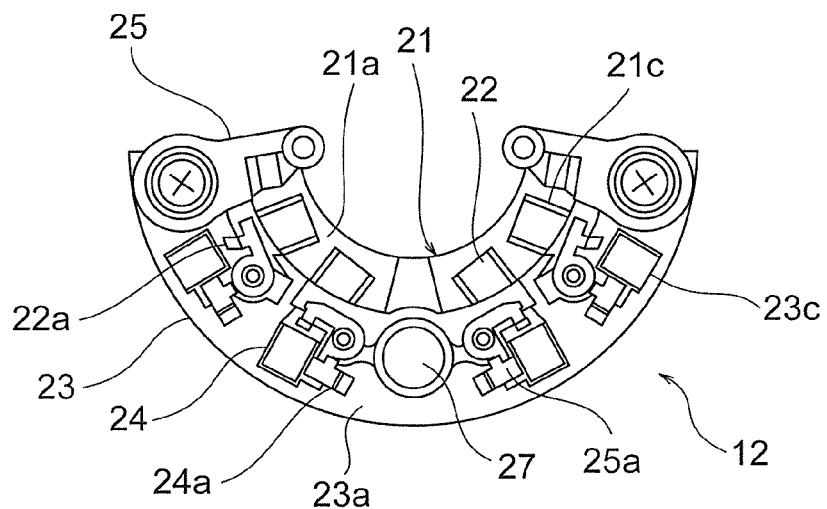
FIG. 2 is a front view illustrating the rectifier illustrated in FIG. 1.
Figure 3:
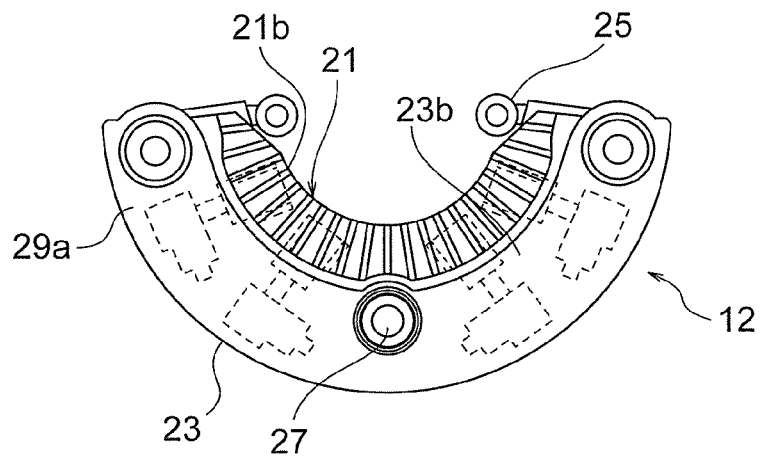
FIG. 3 is a back view illustrating the rectifier illustrated in FIG. 2.

FIG. 2 is a front view illustrating the rectifier 12 illustrated in FIG. 1, and FIG. 3 is a back view illustrating the rectifier 12 illustrated in FIG. 2.

The rectifier 12 includes a positive-pole side cooling plate 21, a negative-pole side cooling plate 23, and a circuit board 25. Positive-pole side diodes 22 are mounted as positive-pole side unidirectional conductive elements on the positive-pole side cooling plate 21, whereas negative-pole side diodes 24 are mounted as negative-pole side unidirectional conductive elements on the negative-pole side cooling plate 23.

The positive-pole side cooling plate 21 is formed into an approximately arc-like band shape by die casting using an aluminum alloy. One side of the positive-pole side cooling plate 21 is a flat-plate like mounting surface 21a. On another side of the positive-pole side cooling plate 21, heat-radiating fins 21b which project radially are formed.

Four diode mounting holes 21c each formed into a recessed rectangular shape are provided radially on the mounting surface 21a of the positive-pole side cooling plate 21. The positive-pole side diodes 22 are respectively soldered into the diode mounting holes 21c. Each of the positive-pole side diodes 22 includes a lead 22a bent into an L-like shape. The positive-pole side diodes 22 are soldered respectively into the diode mounting holes 21c with the leads 22a being oriented radially outward while base electrode surfaces of the positive-pole side diodes 22 ensure an electrically and thermally excellent contact state.

The negative-pole side cooling plate 23 is formed by die casting using an aluminum alloy to have an approximately arc-like band shape with a larger curvature radius than that of the positive-pole side cooling plate 21. One side of the negative-pole side cooling plate 23 is a flat-plate like mounting surface 23a, whereas another side of the negative-pole side cooling plate 23 is a planar direct-mounting surface 23b. The direct-mounting surface 23b is held in abutment against an inner wall surface of the rear bracket 2 through a silicon sheet 29a.

Four diode mounting holes 23c, each being formed into a recessed rectangular shape, are provided radially on the mounting surface 23a of the negative-pole side cooling plate 23. The negative-pole side diodes 24 are soldered into the diode mounting holes 23c. Each of the negative-pole side diodes 24 includes a lead 24a bent into an L-like shape. The negative-pole side diodes 24 are soldered respectively into the diode mounting holes 23c with the leads 24a being oriented in a circumferential direction while base electrode surfaces of the negative-pole side diodes 24 ensure an electrically and thermally excellent contact state.

The circuit board 25 is formed of an insulating material to have an approximately arc-like band shape, integrally with four connection terminals 25a made of a copper plate. The circuit board 25 relays for electrical connection to the stator coil 16, the regulator 18, and the diodes 22 and 24.

The rectifier 12 includes an output terminal 27 illustrated in FIGS. 2 and 3.

Figure 4:
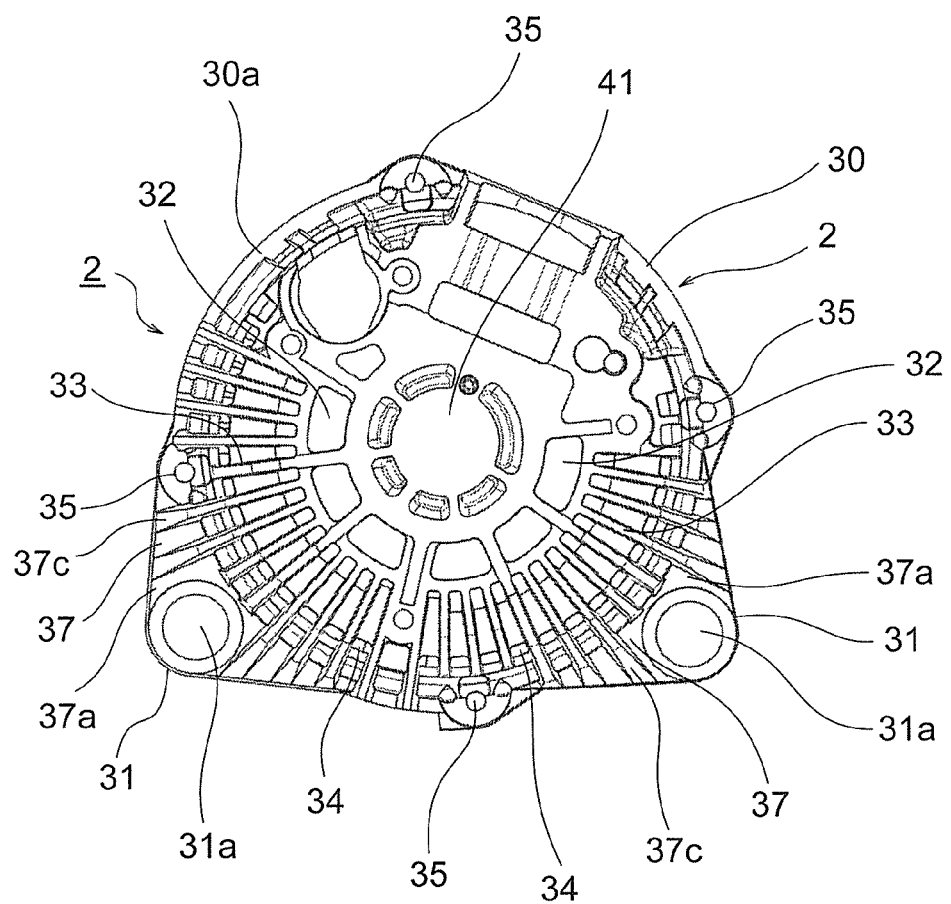
FIG. 4 is a front view illustrating the rear bracket illustrated in FIG. 1.

FIG. 4 is a front view illustrating the rear bracket 2 illustrated in FIG. 1.

The rear bracket 2 includes a bracket main body 30, mounting leg portions 31, and expanded portions 37. The bracket main body 30 has a disc-like shape. The mounting leg portions 31 extend radially outward from the disc-like shaped bracket main body 30 so as to be mounted to an engine bracket (not shown) that is a mounting target member. The expanded portions 37 expand radially from the mounting leg portions 31 toward a circumferential edge portion of the bracket main body 30.

The bracket main body 30 includes a plurality of intake windows 32, a plurality of exhaust windows 34, and a bearing housing portion 41. The intake windows 32 and the exhaust windows 34 are ventilation windows partitioned by ribs 33. The bearing housing portion 41 houses the bearing 40 therein. The plurality of exhaust windows 34 partitioned by the ribs 33 which extend radially are formed on the radially outer side of the plurality of intake windows 32.

Through holes 35 are formed in a circumferential edge portion 30a of the bracket main body 30 at equal intervals. Stator bolts 38 pass through through holes (not shown) of the front bracket 1 so that distal end portions of the stator bolts 38 are threadably fitted into the through holes 35 of the rear bracket 2. In this manner, the stator bolts 38 fix the rear bracket 2 and the front bracket 1 so as to interpose the stator core 15 therebetween. The through holes 35 are formed inside of a circular outer circumferential surface of the circumferential edge portion 30a of the bracket main body 30.

A mounting hole 31a, through which a bolt (not shown) for mounting the AC generator for a vehicle to the engine bracket (not shown) is to be inserted, is formed through each of the mounting leg portions 31.

Each of the expanded portions 37 includes a main body 37a and fin portions 37c. The main body 37a includes a thick portion 37b having a continuously reducing thickness toward the mounting leg portion 31 in an axial direction, as can be understood from FIG. 1. The fin portions 37c are provided on a surface of the main body 37a so as to continuously extend from the distal end portions of the ribs 33 in a radially outward direction.

In the thus configured AC generator for a vehicle, the current is supplied from a battery (not shown) through the brushes 10 and the slip ring 9 to the rotor coil 13 to generate a magnetic flux in the rotor coil 13. A rotation torque of an engine (not shown) is transmitted to the pulley 4 to rotationally drive the shaft 6. As a result, the rotor 7 is rotated.

In this manner, a rotating magnetic field is applied to the stator coil 16 to generate an electromotive force in the stator coil 16. The AC electromotive force passes through the rectifier 12 to be rectified into a direct current. After a magnitude of the direct current is regulated by the regulator 18, the battery is charged with the direct current having the regulated magnitude.

By the rotation of the fans 5 along with the rotation of the rotor 7, cooling air enters interior of the casing 3 through the intake windows 32 which are located on the radially inner side, and is exhausted externally through the exhaust windows 34 which are located on the radially outer side.

In the rectifier 12, heat from the positive-pole side diodes 22 is externally released mainly through the heat-radiating fins 21b which are exposed to the cooling air.

Heat from the negative-pole side diodes 24 is externally released through the cooling air, and is also transferred to the engine bracket which is exposed to outside air by heat transfer through the negative-pole side cooling plate 23, the bracket main body 30, the expanded portions 37, and the mounting leg portions 31.

According to the AC generator for a vehicle of the first embodiment, the rear bracket 2 includes the expanded portions 37 which expand radially from the mounting leg portions 31 toward the circumferential edge portion 30a of the bracket main body 30. Therefore, the heat-transfer sectional area of the AC generator for a vehicle for heat from the rectifier 12 to the engine bracket and the heat-radiating area of the rear bracket 2 increase to improve heat-radiation performance of the rear bracket 2.

Moreover, by providing the expanded portions 37, a volume of a base portion of the AC generator for a vehicle to be supported by the engine bracket increases to improve vibration resistance.

The expanded portions 37 expand radially from the mounting leg portions 31 toward the circumferential edge portion 30a of the bracket main body 30 without extending beyond the mounting leg portions 31. Therefore, the expanded portions 37 do not become obstacles to mount the AC generator for a vehicle to the engine bracket.

Moreover, each of the expanded portions 37 includes the main body 37a and the fin portions 37c provided on the surface of the main body 37a so as to continuously extend from the distal end portions of the ribs 33 in the radially outward direction. Therefore, the heat-radiating area of the expanded portions 37 increases to further improve the heat-radiation performance of the rear bracket 2.

Further, each of the expanded portions 37 has the thick portion 37b with an increased thickness on the side opposite to the front bracket 1 in the axial direction of the main body 37a. Therefore, the heat-transfer sectional area of the AC generator for a vehicle for heat from the rectifier 12 to the engine bracket further increases to further improve the heat-radiating performance for heat from the rectifier 12.

Further, the through holes 35 are formed inside of the circular outer circumferential surface of the circumferential edge portion 30a of the bracket main body 30. Thus, the heat-radiating area of the bracket main body 30 increases correspondingly by the amount of extension of the circular outer circumferential surface of the circumferential edge portion 30a in the radially outward direction. As a result, the heat-radiation performance of the rear bracket 2 is further improved.

Figure 5:
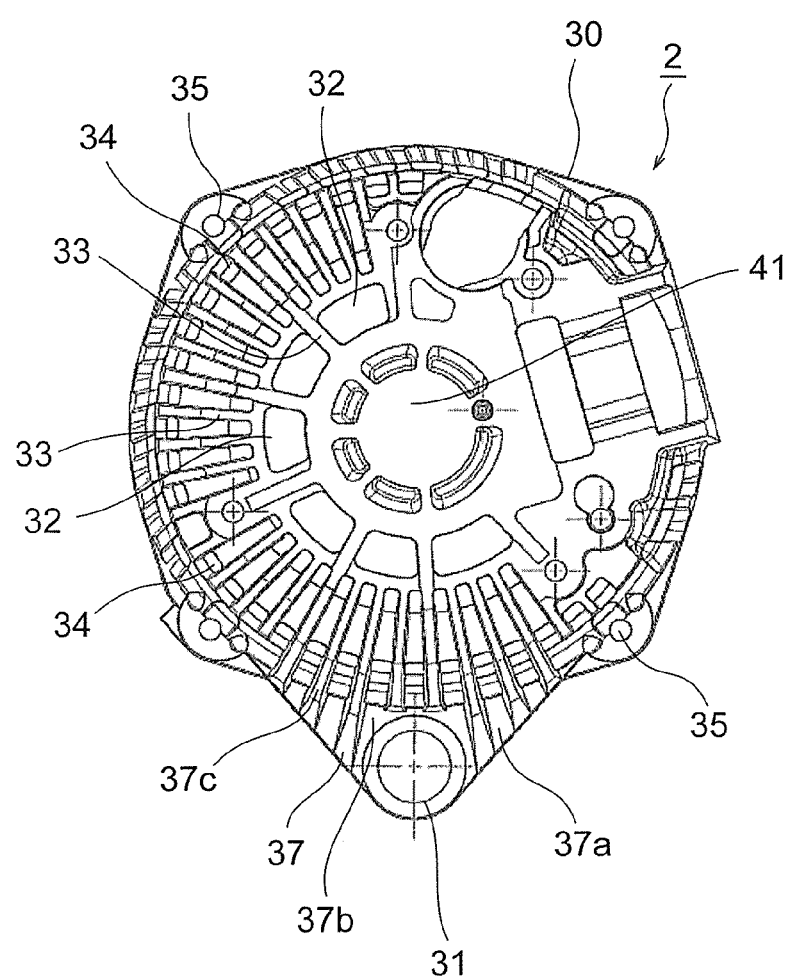
FIG. 5 is a front view illustrating modification of the rear bracket of a first embodiment.
Figure 6:
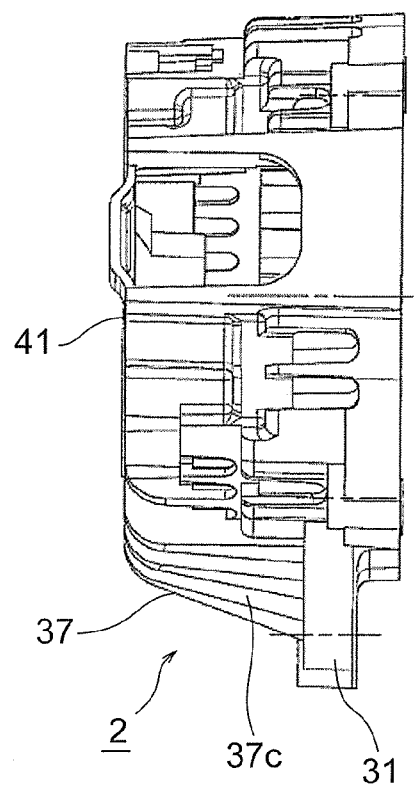
FIG. 6 is a side view illustrating the rear bracket illustrated in FIG. 5.

Even when only one mounting leg portion 31 is provided as illustrated in FIGS. 5 and 6, the sectional area of a heat-transfer path and the heat-radiating surface area are increased by providing the expanded portion 37 to the rear bracket 2. As a result, the heat-radiation performance of the rear bracket 2 is improved.

Second Embodiment

Figure 7:
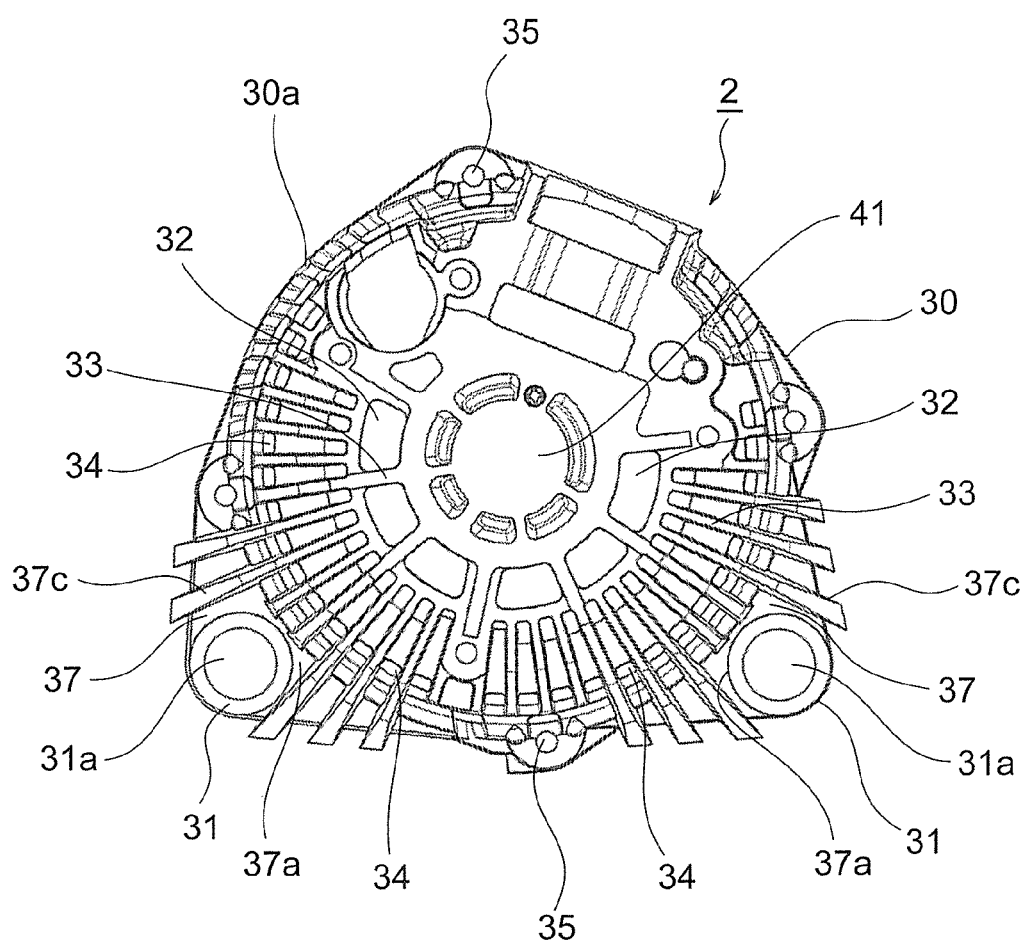
FIG. 7 is a front view illustrating the rear bracket of an AC generator for a vehicle according to a second embodiment of the present invention.

FIG. 7 is a front view illustrating the rear bracket 2 of an AC generator for a vehicle according to a second embodiment of the present invention.

In the second embodiment, a distal end portion of each of the fin portions 37c of the expanded portions 37 extend radially outward from the main body 37a.

Moreover, the through holes 35 are formed in the circular outer circumferential surface of the circumferential edge portion 30a of the bracket main body 30.

The remaining configuration is the same as that of the AC generator for a vehicle according to the first embodiment.

According to the AC generator for a vehicle of the second embodiment, the heat-radiating area of the expanded portions 37 increases by the amount of increase in the radial length of the fin portions 37c as compared with that in the first embodiment. Thus, the heat-radiation performance of the rear bracket 2 increases.

Third Embodiment

Figure 8:
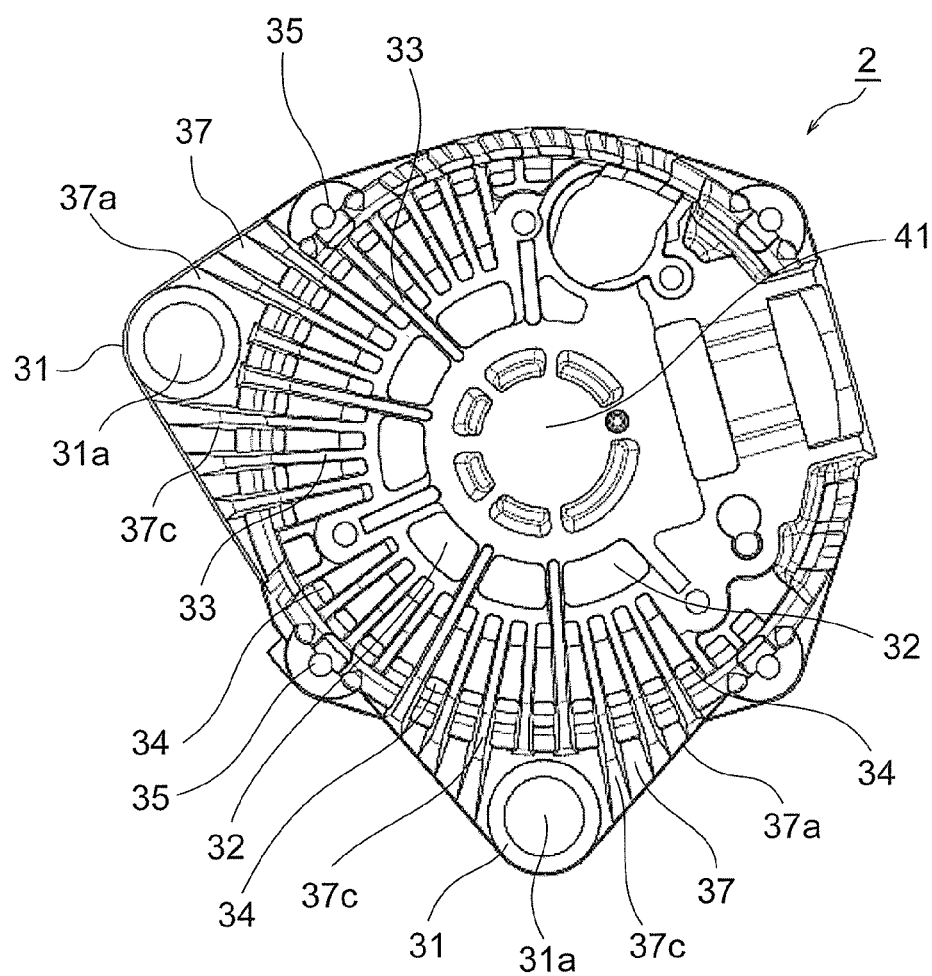
FIG. 8 is a front view illustrating the rear bracket of an AC generator for a vehicle according to a third embodiment of the present invention.
Figure 9:
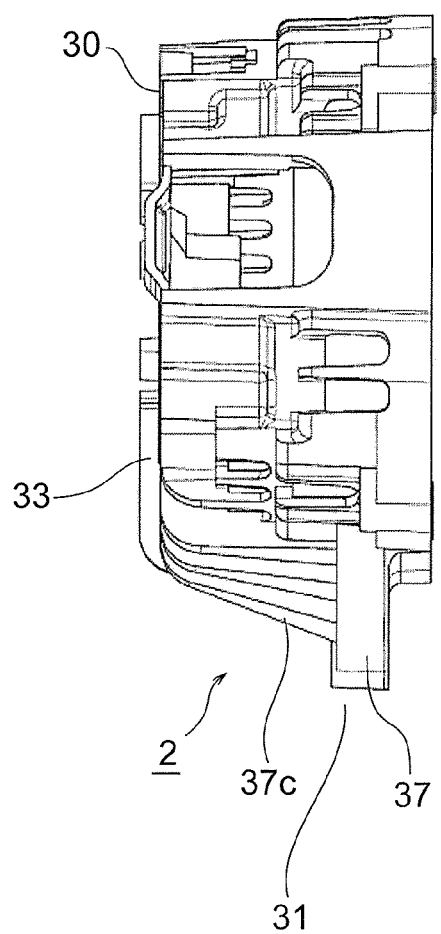
FIG. 9 is a side view illustrating the rear bracket illustrated in FIG. 8.

FIG. 8 is a front view illustrating the rear bracket 2 of an AC generator for a vehicle according to a third embodiment of the present invention. FIG. 9 is a side view illustrating the rear bracket 2 illustrated in FIG. 8.

In the third embodiment, the ribs 33 project from the bracket main body 30 beyond the casing 3 along the axial direction.

Moreover, the through holes 35 are formed in the circular outer circumferential surface of the circumferential edge portion 30a of the bracket main body 30.

The remaining configuration is the same as that of the AC generator for a vehicle according to the first embodiment.

According to the AC generator for a vehicle of the third embodiment, the heat-radiating area of the bracket main body 30 increases by the amount of increase in the axial length of the ribs 33 as compared with that in the first embodiment. Thus, the heat-radiation performance of the rear bracket 2 increases.

Fourth Embodiment

Figure 10:
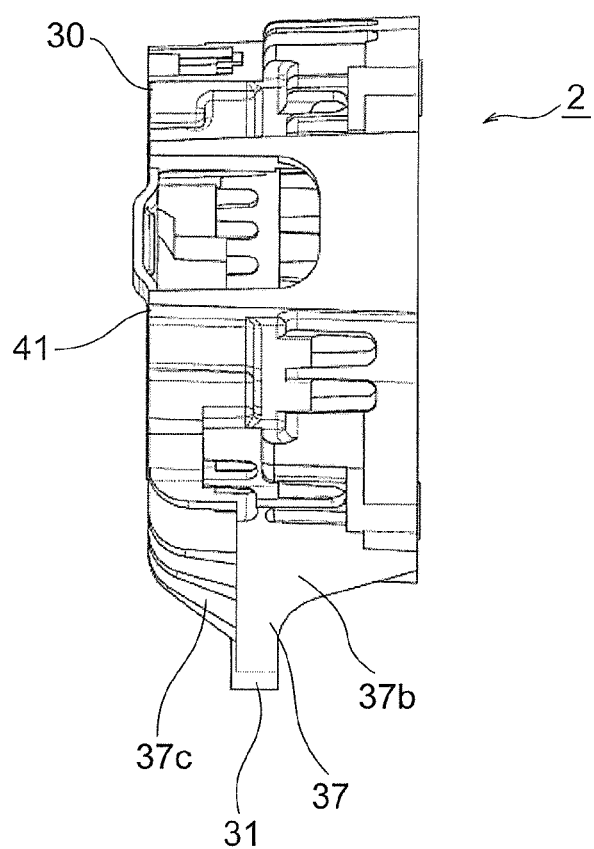
FIG. 10 is a side view illustrating the rear bracket of an AC generator for a vehicle according to a fourth embodiment of the present invention.

FIG. 10 is a side view illustrating the rear bracket 2 of an AC generator for a vehicle according to a fourth embodiment of the present invention.

In the fourth embodiment, each of the expanded portions 37 has the thick portion 37b even on the rotor 7 side. The remaining configuration is the same as that of the AC generator for a vehicle according to the first embodiment.

According to the fourth embodiment, the thick portion 37b is additionally formed even on the rotor 7 side as compared with the first embodiment. Therefore, the thick portions 37b are formed on both sides of the main body 37a in the axial direction. Thus, the heat-transfer sectional area of the expanded portions 37 increase to further increase the heat-transfer sectional area of the AC generator for a vehicle for heat from the rectifier 12 to the engine bracket. Thus, the heat-radiation performance for heat from the rectifier 12 is further improved.

Fifth Embodiment

Figure 11:
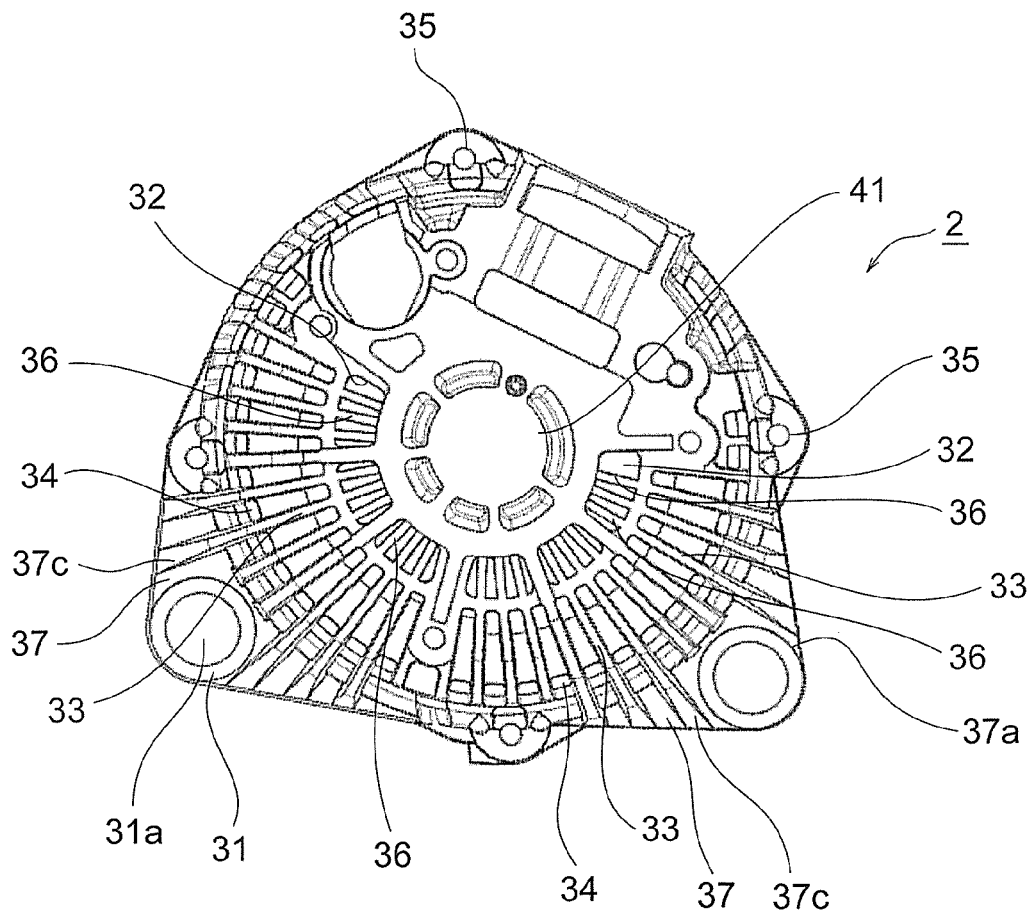
FIG. 11 is a front view illustrating the rear bracket of an AC generator for a vehicle according to a fifth embodiment of the present invention.

FIG. 11 is a front view illustrating the rear bracket 2 of an AC generator for a vehicle according to a fifth embodiment of the present invention.

In the fifth embodiment, the bracket main body 30 includes a plurality of window ribs 36 extending radially and provided over the intake windows 32 provided on the innermost circumferential side so as to surround the bearing housing portion 41. Each of the window ribs 36 connects both radially opposed side portions of the intake windows 32.

Moreover, the through holes 35 are formed in the circular outer circumferential surface of the circumferential edge portion 30a of the bracket main body 30.

The remaining configuration is the same as that of the AC generator for a vehicle according to the first embodiment.

According to the AC generator for a vehicle of the fifth embodiment, a heat-transfer path which connects the bearing housing portion 41 provided in the center of the rear bracket 2 so as to house the bearing 40 therein and the mounting leg portions 31 is increased by providing the window ribs 36 over the intake windows 32. As a result, heat-radiation performance for heat from the bearing 40 is improved.

Sixth Embodiment

Figure 12:
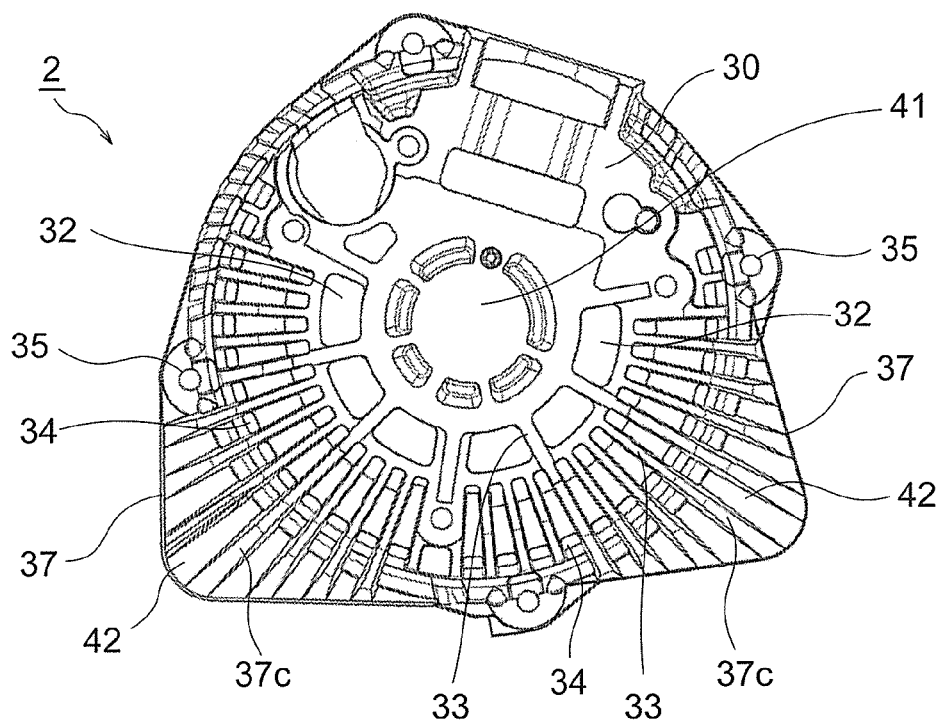
FIG. 12 is a front view illustrating the rear bracket of an AC generator for a vehicle according to a fifth embodiment of the present invention.

FIG. 12 is a front view illustrating the rear bracket 2 of an AC generator for a vehicle according to a sixth embodiment of the present invention.

In the sixth embodiment, no mounting hole is formed in mounting leg portions 42 used for mounting to the engine bracket. Moreover, the expanded portions 37 which expand radially from the mounting leg portions 42 toward the circumferential edge portion 30a of the bracket main body 30 are provided.

The AC generator for a vehicle according to the sixth embodiment is fixed to the engine bracket by using, for example, embedded bolts to the mounting leg portions 42.

Moreover, the through holes 35 are formed in the circular outer circumferential surface of the circumferential edge portion 30a of the bracket main body 30.

The remaining configuration is the same as that of the AC generator for a vehicle according to the first embodiment.

According to the AC generator for a vehicle of the sixth embodiment, no mounting hole is formed in the mounting leg portions 42 used for mounting to the engine bracket. Moreover, the expanded portions 37 which expand from the mounting leg portions 42 toward the circumferential edge portion of the bracket main body 30 are provided. Therefore, the heat-transfer sectional area of the expanded portions 37 increase to further increase the heat-transfer sectional area of the AC generator for a vehicle for heat from the rectifier 12 to the engine bracket. Thus, the heat-radiation performance for heat from the rectifier 12 is further improved.

What is claimed is:

1. An AC generator for a vehicle, comprising:
   a casing comprising a front bracket and a rear bracket;
   a shaft rotatably supported by the casing through an intermediation of a bearing;
   a rotor firmly fixed to the shaft;
   a stator firmly fixed to an inner wall surface of the casing so as to surround the rotor; and
   a rectifier mounted to the rear bracket and electrically connected to the stator, for rectifying an alternating current generated in the stator into a direct current,
   wherein the rear bracket comprises:
       a bracket main body including ventilation windows partitioned by ribs, and a bearing housing portion for housing the bearing therein;
       a mounting leg portion extending radially outward from the bracket main body so as to be mounted to a mounting target member; and
       an expanded portion expanding radially from the mounting leg portion toward a circumferential edge portion of the bracket main body.

2. An AC generator for a vehicle according to claim 1, wherein the expanded portion comprises:
   a main body; and
   fin portions provided on a surface of the main body so as to extend continuously from distal end portions of the ribs in a radially outward direction.

3. An AC generator for a vehicle according to claim 2, wherein the fin portions extend radially outward from the main body.

4. An AC generator for a vehicle according to claim 1, wherein the expanded portion comprises a thick portion having a large thickness in an axial direction, the thick portion being provided on at least one of both surfaces of the main body in the axial direction.

5. An AC generator for a vehicle according to claim 1, wherein:
   the bracket main body has a through hole formed in the circumferential edge portion, for allowing passage of a stator bolt for fixing the rear bracket and the front bracket so as to interpose the stator therebetween; and
   the through hole is formed inside of an outer circumferential surface of the circumferential edge portion.

6. An AC generator for a vehicle according to claim 1, wherein the ribs project out beyond the casing along the axial direction.

7. An AC generator for a vehicle according to claim 1, wherein the bracket main body comprises window ribs extending radially and provided over the ventilation windows provided on an innermost circumferential side so as to surround the bearing housing portion, the window ribs connecting both radially opposed side portions of the ventilation windows.

8. An AC generator for a vehicle according to claim 1, wherein the mounting target member comprises an engine bracket.

* * * * *